(12) United States Patent
Saniger et al.

(10) Patent No.: US 11,373,164 B2
(45) Date of Patent: Jun. 28, 2022

(54) AUTOMATING USER PURCHASES FROM WEB MERCHANTS ON MOBILE DEVICES

(71) Applicant: NATE INC., New York, NY (US)

(72) Inventors: Albert Saniger, New York, NY (US); Edoardo Paluan, London (GB); James Bellamy, London (GB)

(*) Notice: Subject to any disclaimer, the term of this patent is extended or adjusted under 35 U.S.C. 154(b) by 0 days.

(21) Appl. No.: 17/648,300

(22) Filed: Jan. 18, 2022

(65) Prior Publication Data

US 2022/0156716 A1    May 19, 2022

Related U.S. Application Data

(63) Continuation of application No. PCT/US2021/038166, filed on Jun. 20, 2021, and a continuation-in-part of application No. 16/907,307, filed on Jun. 21, 2020, now Pat. No. 11,227,320, said application No. PCT/US2021/038166 is a continuation-in-part of application No. 16/907,307, filed on Jun. 21, 2020, now Pat. No. 11,227,320.

(Continued)

(51) Int. Cl.
  *G06Q 30/00*    (2012.01)
  *G06Q 20/32*    (2012.01)

(52) U.S. Cl.
  CPC .................. *G06Q 20/326* (2020.05)

(58) Field of Classification Search
  CPC ............ G06Q 30/0617; G06Q 30/0641; G06F 16/986; G06F 16/951; G06N 20/00
  See application file for complete search history.

(56) References Cited

U.S. PATENT DOCUMENTS 10,621,655 B1 *    4/2020    Benkreira ............ G06N 3/0454
11,227,320 B2      1/2022    Saniger et al.
(Continued)

OTHER PUBLICATIONS

K. Jin, J. Zhu and G. Fan, "MET: Multi-party E-Commerce Transaction Model," 2011 IEEE Third International Conference on Privacy, Security, Risk and Trust and 2011 IEEE Third International Conference on Social Computing, 2011, pp. 587-590, doi: 10.1109/PASSAT/SocialCom.2011.54. (Year: 2011).*

(Continued)

*Primary Examiner* — Michelle T Kringen
(74) *Attorney, Agent, or Firm* — Patent GC LLC; Alexander Franco

(57) ABSTRACT

A purchasing agent application operates on a mobile device to facilitate a user's purchase of a product featured on a web page of a third party merchant for a gift recipient. The user can select an option in a web browser to share the web page URL with the application. The application communicates with a server to streamline the purchase process based on previously entered user identity, payment and shipping information. The application and/or server use machine learning models to automate the completion of any one or more form fields and/or link selections that the user would otherwise be required complete on the third party merchant's web site to execute the purchase. None of the user, the application or the server need have any prior relationship with the third party merchant. The machine learning models can be trained, for example, using supervised learning, unsupervised learning and/or reinforcement learning techniques.

20 Claims, 15 Drawing Sheets

Related U.S. Application Data

(60) Provisional application No. 63/092,711, filed on Oct. 16, 2020, provisional application No. 63/046,626, filed on Jun. 30, 2020, provisional application No. 63/041,894, filed on Jun. 20, 2020.

(56) References Cited

U.S. PATENT DOCUMENTS

| | | |
|---|---|---|
| 2007/0299736 A1 | 12/2007 | Perrochon et al. |
| 2011/0093360 A1 | 4/2011 | Nguyen et al. |
| 2013/0036025 A1 | 2/2013 | Pottier et al. |
| 2013/0073421 A1 | 3/2013 | Poisson |
| 2013/0103538 A1* | 4/2013 | Scholl .................... G06Q 30/02 705/26.7 |
| 2014/0052587 A1* | 2/2014 | Bereck ............... G06Q 30/0641 705/27.1 |
| 2016/0379213 A1* | 12/2016 | Isaacson ............ G06Q 20/3678 705/44 |
| 2021/0398181 A1 | 12/2021 | Saniger et al. |

OTHER PUBLICATIONS

"International Search Report and Written Opinion for International Application No. PCT/US2021/038166, Search completed Aug. 17, 2021, dated Sep. 22, 2021.", 12 Pages.

Jin, et al., "MET: Multi-party E-Commerce Transaction Model", 2011 IEEE Third International Conference on Privacy, Security, Risk and Trust and 2011 IEEE Third International Conference on Social Computing, 2011, pp. 587-590, doi 10.11 09/PASSAT/SocialCom.2011.54 (Year: 2011), 4 Pages.

* cited by examiner

FIG. 3A nate evan@nate.tech

< Go Back sign up
evan@nate.tech

First Name

Last Name

Zip Code

Add me

FIG. 3C

Skip shipping address

Address

+ Add Company, C/O, Apt, Suite, Unit

City

Country
US

State

ZIP Code

Code
(US) +1

Phone

Save

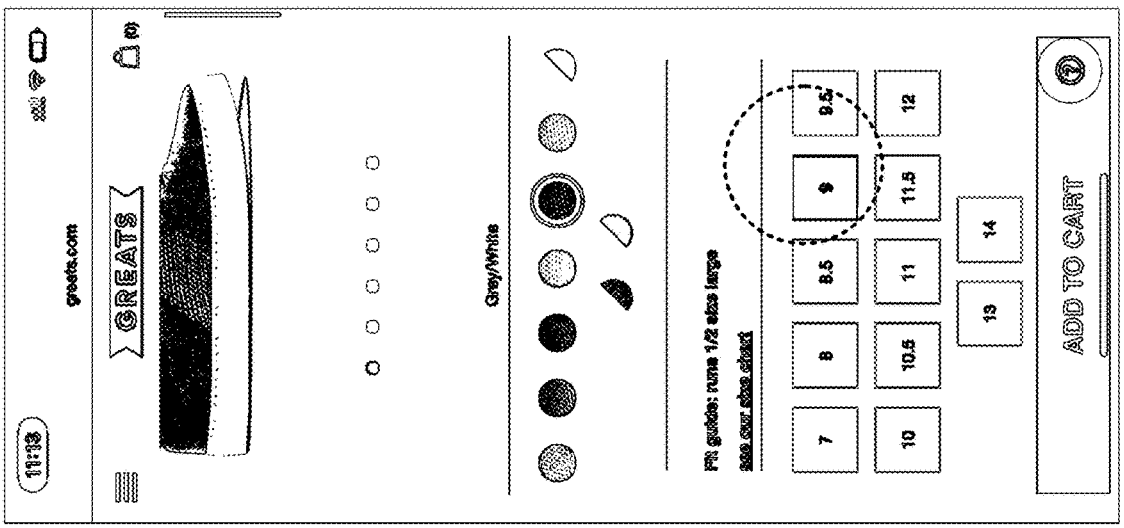
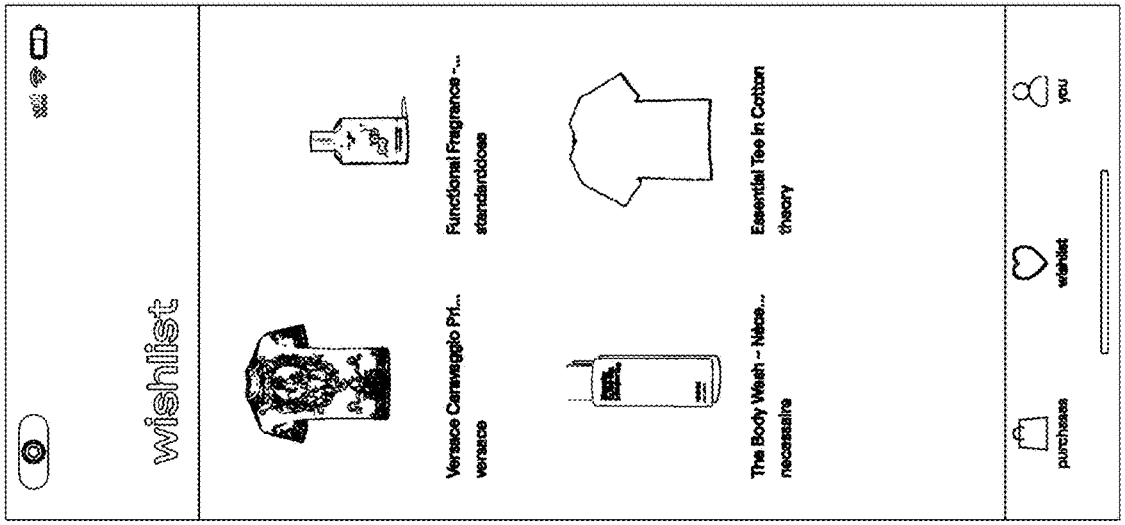
FIG. 5A  FIG. 5B  FIG. 5C

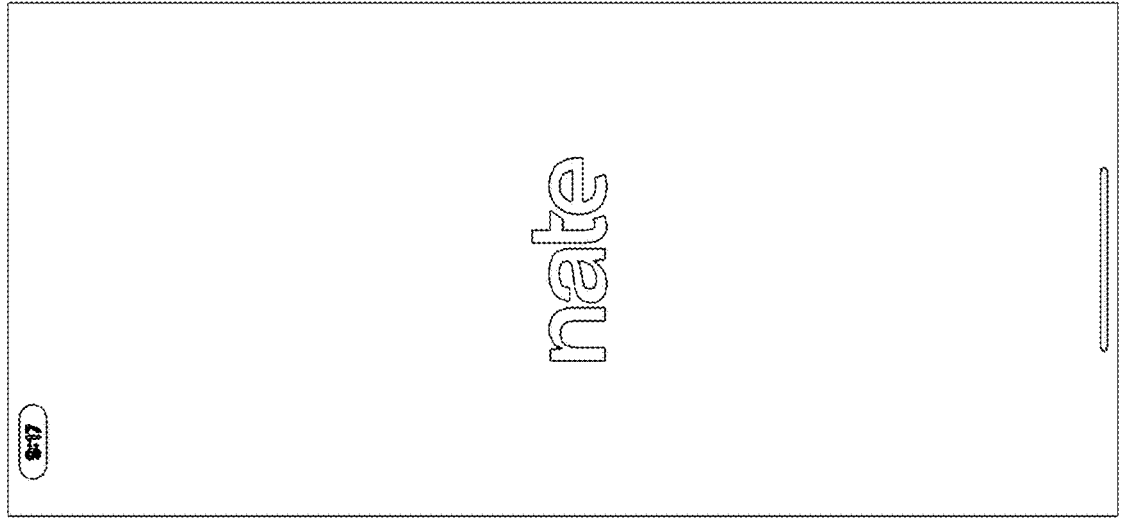
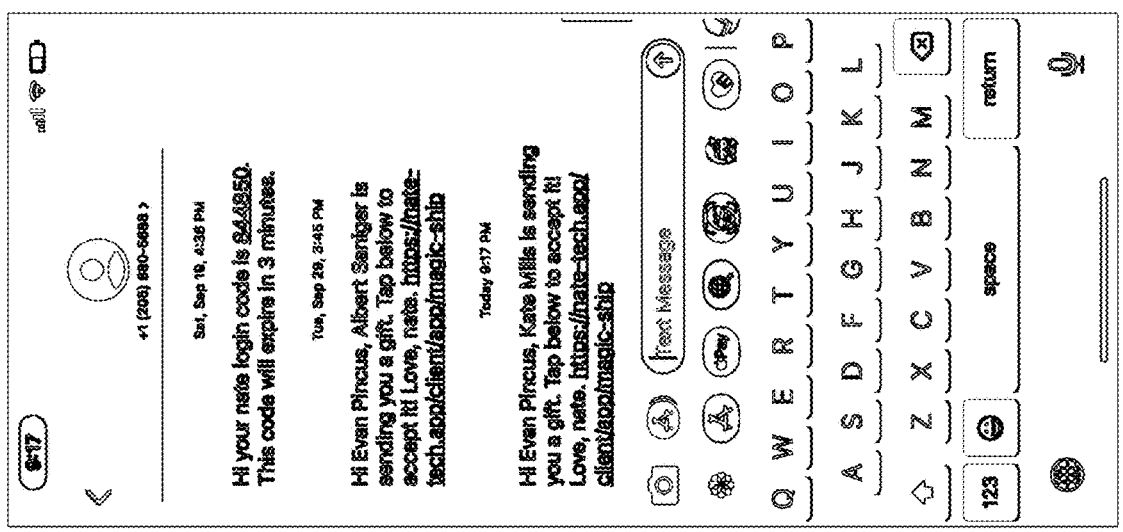
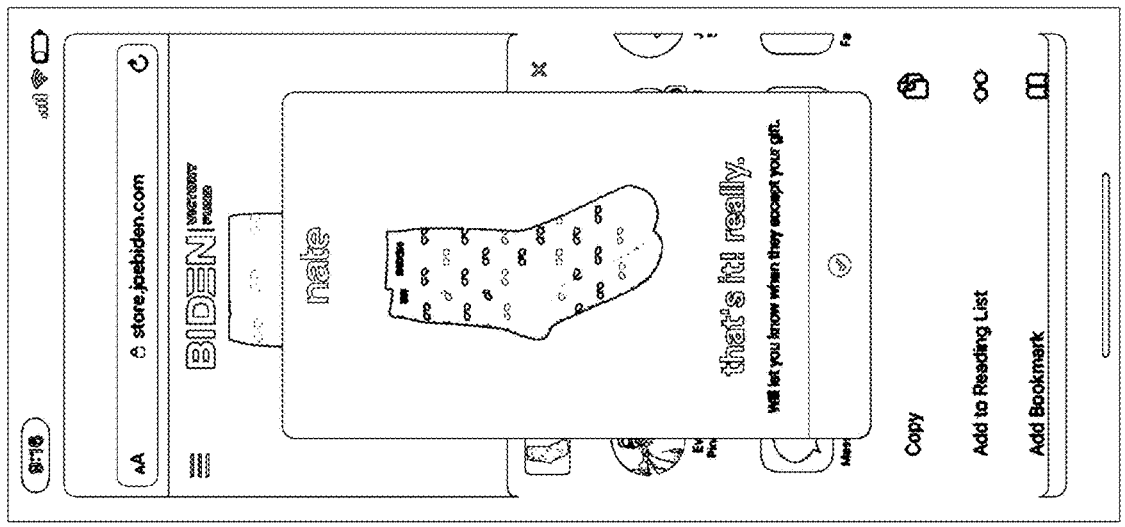

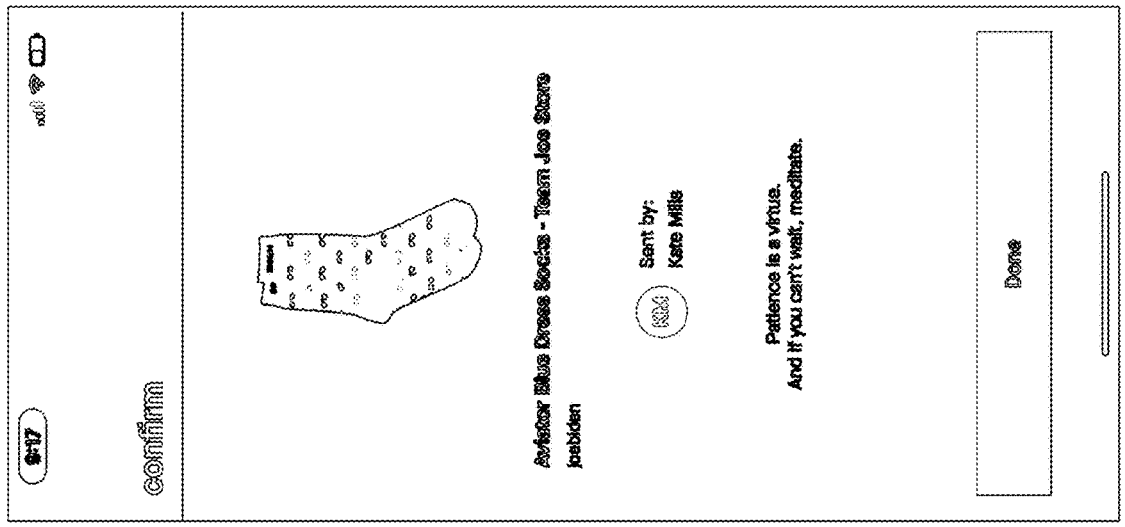

AUTOMATING USER PURCHASES FROM WEB MERCHANTS ON MOBILE DEVICES

RELATED APPLICATIONS

The subject matter of this application is related to Patent Cooperation Treaty Application PCT/US2021/038166, filed on 2021 Jun. 20, U.S. Provisional Application No. 63/041,894, filed on 2020 Jun. 20, U.S. Utility patent application Ser. No. 16/907,307, now U.S. Pat. No. 11,227,320, filed on 2020 Jun. 21, U.S. Provisional Application No. 63/046,626, filed on 2020 Jun. 30, and U.S. Provisional Application No. 63/092,711, filed on 2020 Oct. 16, all of which applications are hereby incorporated by reference.

SUMMARY OF THE INVENTION

A purchasing agent application operates on a mobile device to facilitate a user's purchase of a product featured on a web page of a third party merchant. The user can select an option in a web browser to share the web page URL with the application. The application communicates with a server to streamline the purchase process based on previously entered user identity, payment and shipping information. The application and/or server use machine learning models to automate the completion of any one or more form fields and/or link selections that the user would otherwise be required complete on the third party merchant's web site to execute the purchase. None of the user, the application or the server need have any prior relationship with the third party merchant. The machine learning models can be trained, for example, using supervised learning, unsupervised learning and/or reinforcement learning techniques, and training data can be gathered using human and/or machine generated purchase completions performed on sample websites.

In one embodiment, a method is performed by a system including a purchasing agent application executing on a mobile computing device and a server computer system in computer network communication with and operating in coordination and association with the purchasing agent application. The mobile computing device and the server computer system can each include at least one processor and a memory. The method can include: the purchasing agent application receiving a URL for a web page from a other application executing on the mobile computing device in response to user input to the other application by a user of the mobile computing device, wherein the web page is published by and on a web site of a third party online merchant unassociated with the purchasing agent application and the server computing system; analyzing one or more of the URL, the web page, and a document object model of the web page to identify a set of one or more purchasable items featured on the web page; the purchasing agent application presenting in a user interface an identification of the set of items in association with an option to purchase the set of items from the third party online merchant; the purchasing agent application, in response to user input indicating acceptance of the option to purchase the set of items, transmitting an instruction to the server computer system to cause the server computer system to execute a purchase of the set of items; the server computer system, in response to receiving the instruction, loading the web page in its memory; and the server computer system, further in response to receiving the instruction and starting from the web page, using a machine learning model to interact with the web site of the third party online merchant to complete the purchase of the set of items on behalf of the user.

The other application can be a web browser, the URL can be received by the purchasing agent application in response to a user selection of a share option to share the URL with the purchasing agent application, and the presenting the identification of the set of items can be performed by the purchasing agent further in response to the user selection of the share option. The web page can be a product offering web page for a product on a web site of the third party online merchant. The web page can be a shopping cart web page on a web site of the third party online merchant.

The method can further include: the purchasing agent application receiving purchase profile information from the user through the user interface, the purchase profile information comprising a name, a form of payment, and a shipping address; and the purchasing agent application transmitting the purchase profile information to the server computer system. The method can further include receiving from the user through the user interface a second form of payment or a second shipping address. The identification of the set of items can be presented in the user interface further in association with an option to select among one or more instances of previously entered forms of payment. The identification of the set of items is presented in the user interface further in association with an option to select among one or more instances of previously entered shipping addresses.

The method can further include the purchasing agent application presenting in a user interface an identification of the set of items in association with an option to add the set of items to a list of saved items. The option to purchase the set of items from the third party online merchant can be presented in response to a user selection of the set of items from the list of saved items.

The identification of the set of items can be obtained from the document object model of the web page.

The method can further include the purchasing agent application transmitting one or more of the URL and the document object model of the web page to the server computer system.

The "analyzing one or more of the URL, the web page, and a document object model of the web page to identify a set of one or more purchasable items featured on the web page" can be performed using a machine learning model.

The method can further include: further in response to receiving the instruction, analyzing the document object model of the web page to identify for the set of one or more items, one or more product configuration variables; and for each of the one or more product configuration variables, identifying a value selected by the user on the web page through the other application, wherein the server computer system completes the purchase of the set of items in accordance with the identified value for each of the one or more product configuration variables. The one or more product configuration variables can be identified using a machine learning model.

The method can further include: analyzing the web page to identify, for the set of one or more items, one or more product configuration variables; the purchasing agent presenting in a user interface an identification of the one or more product configuration variables; the purchasing agent application, receiving user input selecting a value for each of the one or more product configuration variables; and the purchasing agent application transmitting the selected value(s) to the server computer system, wherein the server computer system completes the purchase of the set of items in accordance with the identified value for each of the one or more product configuration variables. The one or more product configuration variables can be identified using a machine learning model. The purchasing agent can present the identification of the one or more product configuration variables in the user interface in association with the option to purchase the set of items. The purchasing agent can present the identification of the one or more product configuration variables in the user interface in response to the user input indicating acceptance of the option to purchase the set of items.

The "analyzing one or more of the URL, the web page, and a document object model of the web page to identify a set of one or more purchasable items featured on the web page" can be performed in response to the user selection of the share option.

A system including the purchasing agent application and the server computer system can perform any one or more of the foregoing methods.

A non-transitory computer readable medium can have instructions stored thereon, where the instructions are executed to cause the purchasing agent application and the server computer system to perform any one or more of the foregoing methods.

In one embodiment, a method is performed by a system including a first purchasing agent application executing on a first mobile computing device, a second purchasing agent application executing on a second mobile device and a server computer system in computer network communication with and operating in coordination and association with the purchasing agent applications. The mobile computing devices and the server computer system each have at least one processor and a memory. The method can include: the first purchasing agent application receiving a URL for a web page from a other application executing on the first mobile computing device in response to user input to the other application by a user of the first mobile computing device, wherein the web page is published by and on a web site of a third party online merchant unassociated with the purchasing agent applications and the server computing system; analyzing one or more of the URL, the web page, and a document object model of the web page to identify a set of one or more purchasable items featured on the web page; the first purchasing agent application presenting in a user interface an identification of the set of items in association with an option to purchase the set of items from the third party online merchant as a gift for a gift recipient; the first purchasing agent application, in response to user input indicating acceptance of the option to purchase the set of items as a gift for the gift recipient, causing a message to be sent to the gift recipient informing the gift recipient of the gift; the second purchasing agent application, in response to user input by the gift recipient indicating acceptance of the gift, transmitting an instruction to the server computer system to cause the server computer system to execute a purchase of the set of items; the server computer system, in response to receiving the instruction, loading the web page in its memory; and the server computer system, further in response to receiving the instruction and starting from the web page, using a machine learning model to interact with the web site of the third party online merchant to complete the purchase of the set of items on behalf of the user.

A system including the purchasing agent applications and the server computer system can perform the foregoing method.

A non-transitory computer readable medium can have instructions stored thereon, where the instructions are executed to cause the purchasing agent applications and the server computer system to perform the foregoing method.

In one embodiment, a method is performed by two or more computers, each computer having at least one processor and a memory. The method can include: presenting an option in a first computer user interface to a gifting user to purchase a gift for a gift recipient; receiving an instruction, from the gifting user through the first computer user interface, to purchase the gift for the gift recipient; presenting an option in a second user interface to the gift recipient to accept or decline the gift; receiving an acceptance, from the gift recipient, through the second computer user interface, of the gift; and causing the gift to be purchased by the gifting user for the gift recipient.

The method can further include presenting to the gift recipient an identification of the gift before or during presenting the option to accept or decline the gift.

The method can further include presenting to the gift recipient an identification of the gift after receiving the acceptance, from the gift recipient, through the second computer user interface, of the gift.

The method can further include presenting an option in the second user interface to the gift recipient to confirm or supply a shipping address.

The method can further include: presenting an option in the first user interface to the gifting user to select among: presenting to the gift recipient an identification of the gift before or during presenting the option to accept or decline the gift, and presenting to the gift recipient an identification of the gift after receiving the acceptance, from the gift recipient, through the second computer user interface, of the gift.

The method can further include transmitting a message to the gift recipient informing the gift recipient of the gift, wherein the presenting the option in the second user interface to the gift recipient to accept or decline the gift is in response to the transmitting.

The method can be performed such that the transmitting is performed via any of: text message, e-mail, mobile device application notification, desktop computer application notification, and website notification through a web browser.

The method can further include posting a message on a website, the message including a link through which the gift can be accepted, wherein the presenting the option in the second user interface to the gift recipient to accept or decline the gift is in response to the gift recipient activating the link.

A system including the two or more computers can perform any one or more of the foregoing methods.

A non-transitory computer readable medium can have instructions stored thereon, where the instructions are executed to cause the two or more computers to perform any one or more of the foregoing methods.

BRIEF DESCRIPTION OF THE DRAWINGS

FIGS. 3A-E depict a sequence of screens showing a user creating an account and entering user profile information including name, e-mail, shipping address and payment information.

FIGS. 5A-L show a sequence of screens where a user uses the system to add an item featured on a web page to a wishlist and then purchase the item from the wishlist.

FIGS. 7A-H show a sequence of screens where a gifting user selects an item to gift to a gift recipient through a text message using the nate app.

Figures 8C, 8D, 8E:
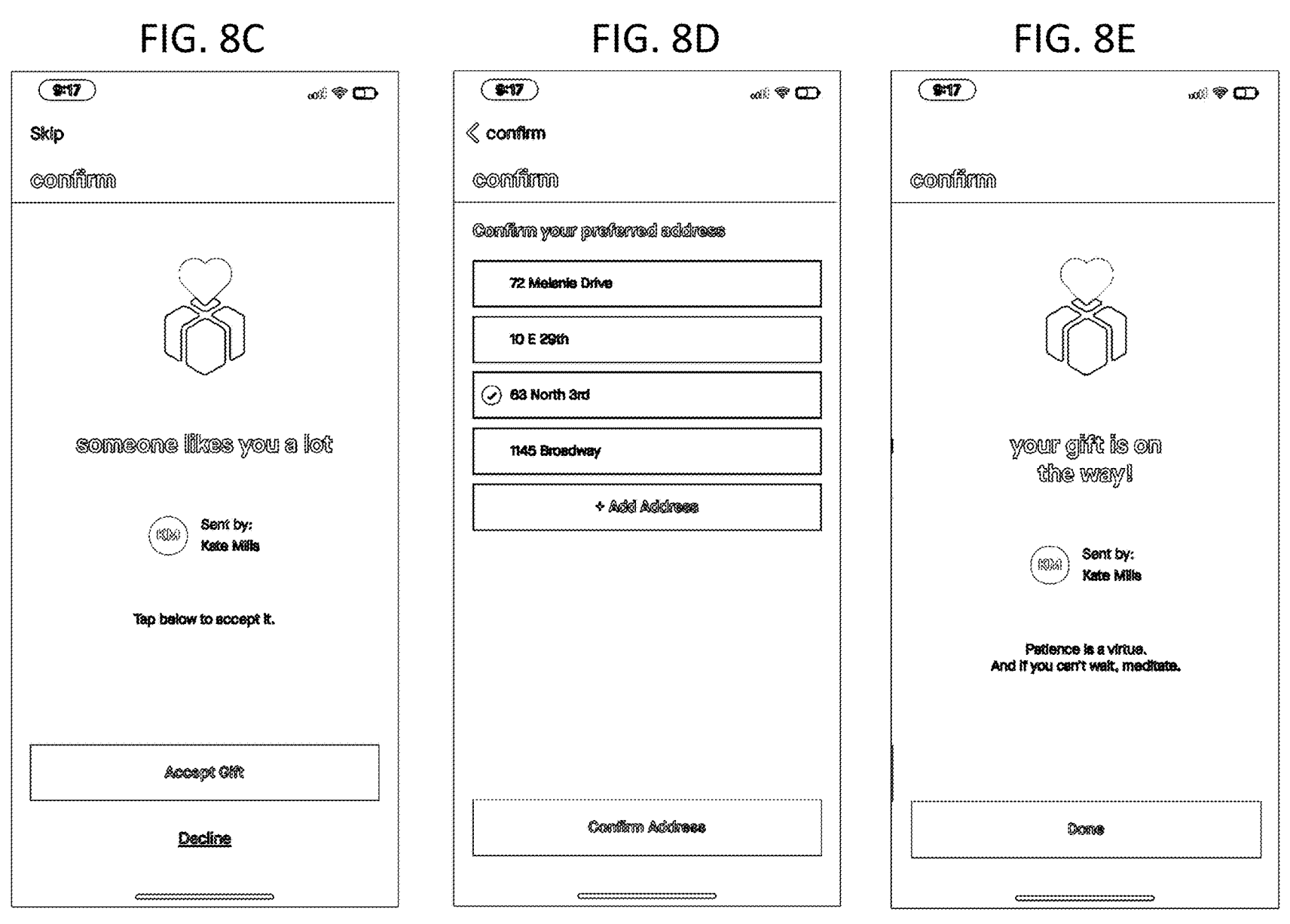

FIGS. 8A-F show a sequence of screens where a gift recipient is notified by text message of a gift from a gifting user and is given the option of accepting or declining the gift and of confirming a shipping address.

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list. In the following disclosure the term communicate should be understood to encompass transmission by a sender and receipt by a receiver.

Overview

Figure 1:
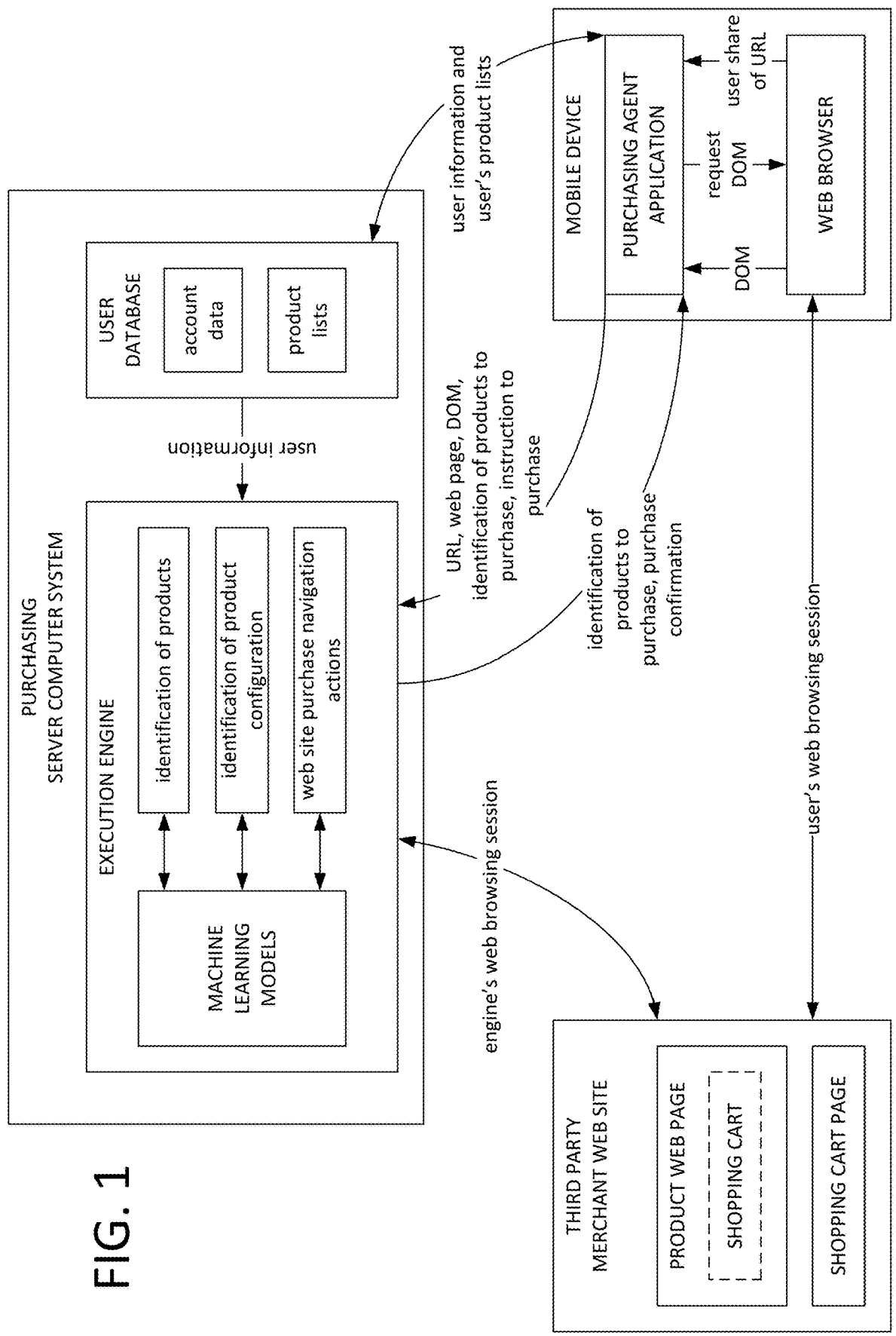
FIG. 1 illustrates a schematic diagram showing data flows between, and methods performed by, components of a system for automating user purchases from web merchants on mobile devices.

FIG. 1 illustrates a schematic diagram showing data flows between, and methods performed by, components of a system for automating user purchases from web merchants on mobile devices.

The system can include a purchasing agent application operating on a user's mobile device, such as a mobile phone or tablet. The purchasing agent application can be configured to receive a uniform resource locator (URL) of a target web page being browsed in a web browser by a user of the mobile device. In one embodiment, the user selects a share option in the web browser for a web page displayed in the browser, selecting to share the page specifically with the purchasing agent application, when the user wants to buy a purchasable item (e.g. a product or service) featured on the web page.

The target web page being browsed in the web browser may be a page of a third party merchant web site that features a set of one or more purchasable items with a user selectable option to initiate a purchase process. The third party need have no relationship or association with the system or its operators, and accordingly, the web page may be any web page on any web site featuring products for sale. The set of one or more purchasable items may be a single item, a group of items purchasable as a set, or multiple individual items or sets of items. The web page may also support the selection and/or input by the user of values for product configuration variables for each, all, or any of the set of items. By way of example, an article of clothing offered for sale may include variables such as quantity, size, and color, for each of which a user may be prompted to select a value in association with a purchase. The web page may be product page featuring a single item for sale, such as with a "buy" button to initiate a purchase process which would subsequently include obtaining identity, payment, and shipping information from the user, along with providing a final confirmation of the purchase. The web page may alternatively be a shopping cart page, where the user had previously added one or more items to a merchant shopping cart, and is now ready to complete their purchase. The web page may be a product page that is augmented with a shopping cart feature or functionality, wherein the shopping cart appears once a "add to shopping cart" option is selected for the product featured on the page.

The system can also include a purchasing server computer system that operates in a client-server relationship with the purchasing agent application over a computer network, such as the Internet. The server computer system can be embodied as a set of one or more computers, such as a cloud based server system.

In response to the user's action to share a web page with the purchasing agent application, the mobile web browser passes the URL of the page to the purchasing agent application. The application can also request and receive from the web browser a document object model (DOM) representing the current state of the web page as displayed in the web browser. The purchasing agent application can then communicate one or more of the shared URL, the web page, and the DOM obtained from the mobile browser to the server computer system either directly in response to the user's share action or after further user input to the application. The server computer system uses one or more of the shared URL, the web page, and the DOM to access the third party merchant web site. Using account data previously obtained from the user, the server computer system automatically navigates the third party website to complete the purchase, which may involve entry of multiple form fields, selections and confirmations, without further input from the user. The server computer can be configured to leverage trained machine learning models in order to reliably navigate the website of any merchant to execute purchases on behalf of users.

The purchasing agent application can be configured to request and receive input from the user of information necessary for making purchases, such as name, shipping address and payment information. The application, in turn, can communicate the entered information to the server computer system, which can store the information in a user database in association with the user and/or their system credentials (sign in information). The agent application can provide an interface through which a user can manage an account for the system with the ability to view and/or modify data, such as system credentials and previously entered information for making purchases. The agent application can be configured to support entry of multiple sets of information for a user, such as name, address and payment information, or any other purchase information, so that the user can choose among the different information when making any individual purchase. For example, a user can enter multiple credit card numbers into the system, and the agent application can present the option to select from those credit card numbers when instructing the agent application to make a purchase.

In addition to traditionally required purchase information, such as name, shipping address and payment information, the user's account for the system can be configured to support additional profile and/or preference information for the user. By way of example, the system can support one or more user purchase profiles for a user to store user preferences for purchases, such as name, form of payment, shipping address, and shipping preference (same day, 1-day, standard, economy). The purchase profile information can then be selected and/or defaulted by a user and applied by the server computer system automatically when making purchases without having to request further information of the user when executing a purchase.

The system can perform an analysis of one or more of the URL, the web page, and the DOM to identify a set of one or more purchasable items featured on the web page and offered for sale. For example, some web pages encode an identification of a product being offered for sale into the URL of a web page, which identification can be extracted in order to identify the product. Some web pages use the well-known Open Graph Protocol to identify a set of one or more products featured on a web page and offered for sale. The title of a web page can be used to identify a product. Items for sale can also be identified by analyzing a web page and/or the DOM using a trained machine learning model.

The analysis of one or more of the URL, the web page, and/or the DOM to identify a set of one or more purchasable items featured on the web page can be performed by the mobile device, by the server computer system, in part by each, or by both. By way of example, the agent can perform an analysis based on the Open Graph Protocol, while the server can perform a machine learning model analysis. In the case that one type of analysis fails, another may succeed and then the result(s) of the successful analysis can be used. The analysis can be performed in response to the user's action to share the web page with the purchasing agent application or it can be performed in advance of the user's action to share the web page (such as by preprocessing certain popular merchant websites in advance). The analysis can also be performed in part in advance of (such as by analyzing certain popular merchant websites in advance) and in part in response to the share action (by using previously analyzed structures of the websites).

In one embodiment, in response to the user's share action in the web browser, the purchasing agent application presents to the user the identified set of one or more purchasable items in a user interface in conjunction with a selectable option to purchase. The user is therefore able to review the identification of the set of items and instruct that the purchase should be executed, such as by selecting a "buy" button. The identification of the set of items to be purchased can be presented, for example, in the form of one or more images, video, text, or any combination thereof. In the case the purchasing agent application is configured to or is able to identify the products independently without the server, no communication with the server is necessary before the agent presents the identification of the items and receives the user's instruction to buy them. In the case that the agent application is not able to or is not configured to identify the items, but the server is, the agent can await a response from the server with an identification of the set of items, before presenting the identification to the user along with the purchase instruction option. In the case that neither the agent nor the server (if so configured) is able to identify any purchasable items on the target web page, the purchasing agent application can be configured to present an error notice to the user indicating that no purchasable items were able to be identified.

In response to the user's explicit purchase instruction, such as by selecting a "buy" button presented by the purchasing agent application, the application transmits an instruction to the server computer system to execute the purchase. In the case that the application has not already transmitted one or more of the URL, the web page, and the DOM to the server, they can be transmitted along with the instruction to purchase.

In response to receiving the instruction to purchase from the purchasing agent application, a purchase execution engine operating on the server computing system uses one or more of the URL, the web page and the DOM to open up a new web browsing session with the third party merchant web site. For example, the purchase execution engine can use the URL received from the purchasing agent application to independently fetch and load the web page into its memory. As another example, the purchase execution engine can receive the DOM from the purchasing agent and load the DOM into its own memory.

The purchase execution engine can be configured to independently identify the set of purchasable items on the web page or it can be configured to receive a transmission of the identification from the purchasing agent application. Using one or more machine learning models, the purchase execution engine can navigate the third party merchant web site, obtaining account data, such as purchase profile and/or product profile data for the user from the user database as necessary to populate any form fields and/or execute any web browsing navigation actions on the web site, necessary to complete the purchase.

Once the purchase execution engine successfully completes the purchase, it can communicate back to the purchasing agent application that the purchase has been completed. The purchasing agent application can, in turn, provide a notification to the user that the purchase has been completed and/or update a list of purchased items to reflect the purchase.

A purchasable item or set of items featured on a web page may include a set of one or more product configuration variables, such as quantity, size, and color. Product web pages for products with such variables generally solicit or require input from a user for values of the variables before enabling an option to purchase.

In one embodiment, a user is expected to have selected values (or accepted default values) for all required product configuration variables before selecting to share the page with the purchasing agent application. The user's selections, in this case, will typically be encoded into the web browser's DOM, which can be retrieved by the purchasing agent application and communicated to the execution engine in association with the instruction to purchase. The purchase execution engine, in turn, can analyze the web page and/or the DOM using a trained machine learning model to identify the product configuration variables, as well as extract values previously selected by the user for those variables. Using the extracted values and variables, the purchase execution engine can then continue on with the navigation of the website and complete the purchase in accordance with the user's selections. In the case that a required selection was not made by the user in advance, the purchase execution engine can raise an error to be communicated back to the user via the purchasing agent application.

In one embodiment, a user need not be expected to have selected values for any required product configuration variables before selecting to share the page with the purchasing agent application. In this case, in response to a user share action of a web page with the purchasing agent or in response to a purchase instruction, the purchasing agent can communicate one or more of the URL, the web page and the DOM to the purchase execution engine. In the case that the URL is shared, the purchase execution engine can independently fetch and load the web page, otherwise it can load the web page or DOM communicated by the agent application. The purchase execution engine, in turn, can analyze the web page and/or the DOM using a trained machine learning model to both identify the product configuration variables, as well as possible values or a format for those variables if applicable. A text entry variable, such as requesting input of initials for monogramming of a shirt, may not have a set of possible values, but only a format. The variables and possible values or format, if applicable, can then be communicated by the engine back to the agent application which can present the variables to the user for input.

In one embodiment, the purchasing agent application can present the identified product configuration variables to the user for input at the time of and in association with presenting to the user the identification of the set of items for purchase. In this case the agent can communicate with the server upon the user's election to share the web page with the application, and the server can in turn perform the analysis and communicate back to the agent the variables and any applicable values and/or formats to be presented to the user with the purchase option. Alternatively, the user can first provide the purchase instruction and then the purchasing agent application can return to the user for input. In this case the agent can communicate with the server after receiving the user's instruction to purchase, and the server can in turn perform the analysis and communicate back to the agent the variables and any applicable values and/or formats to be presented to the user in a subsequent message or user interface presentation to the user.

In one embodiment, the system can be configured to support one or more reusable user item or product profiles for a user to specify product configuration variable preferences for items or products to be purchased such as size, and color. When the system can match the user-supplied default values for identified product variables, these values can be automatically populated in any identified fields for product configuration variables in a user interface of the purchasing agent application. In addition or alternatively, the purchasing agent application can skip requesting user input for any product configuration variable for which the user has supplied a default value or user preference.

In one embodiment, the purchasing agent application can be configured to present to the user an option to add an identified purchasable set of one or more items to a list, such as wish list or saved items list. Such lists can be maintained in a user database on the server computer system, by the purchasing agent or both. The lists can be made available to the user through the purchasing agent application and items on the lists can be subsequently selected for purchase by the user in accordance with the foregoing methods.

Alternative and Additional Embodiments

Any one or more modifications, which will now be described, can be incorporated in various alternative and additional embodiments.

The mobile device can be replaced with or embodied in any computer or computing device used by an end user seeking to facilitate the process of making purchases from web-based merchants. Such a computing device need not be mobile/portable and can be, for example, a laptop computer, a notebook computer, a desktop computer, a computer workstation, a computer terminal communication with a server or cloud based computing system, or a computer embedded in another device, such as a television, refrigerator or automobile.

The user database, the execution engine, or both, can be implemented in part or wholly on either of the mobile device and the server computer system. For example, the execution engine can operate partly or fully within the purchasing agent application on the mobile device. Some or all of the machine learning models can be incorporated in the purchasing agent while training and/or creation of those models can remain on the server computer system. For example, any of the machine learning models to handle identification of products, identification of product configuration variables and values, and website navigation actions can be implemented and executed within the purchasing agent application on the mobile device.

The server computer system can operate to complete a purchase based on output from machine learning models operating on the mobile device. The user data for one or more users of the mobile device can be maintained on the mobile device by the purchasing agent application. The purchasing agent application can be integrated with and/or made a part of the web browser operating on the mobile device.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 2:
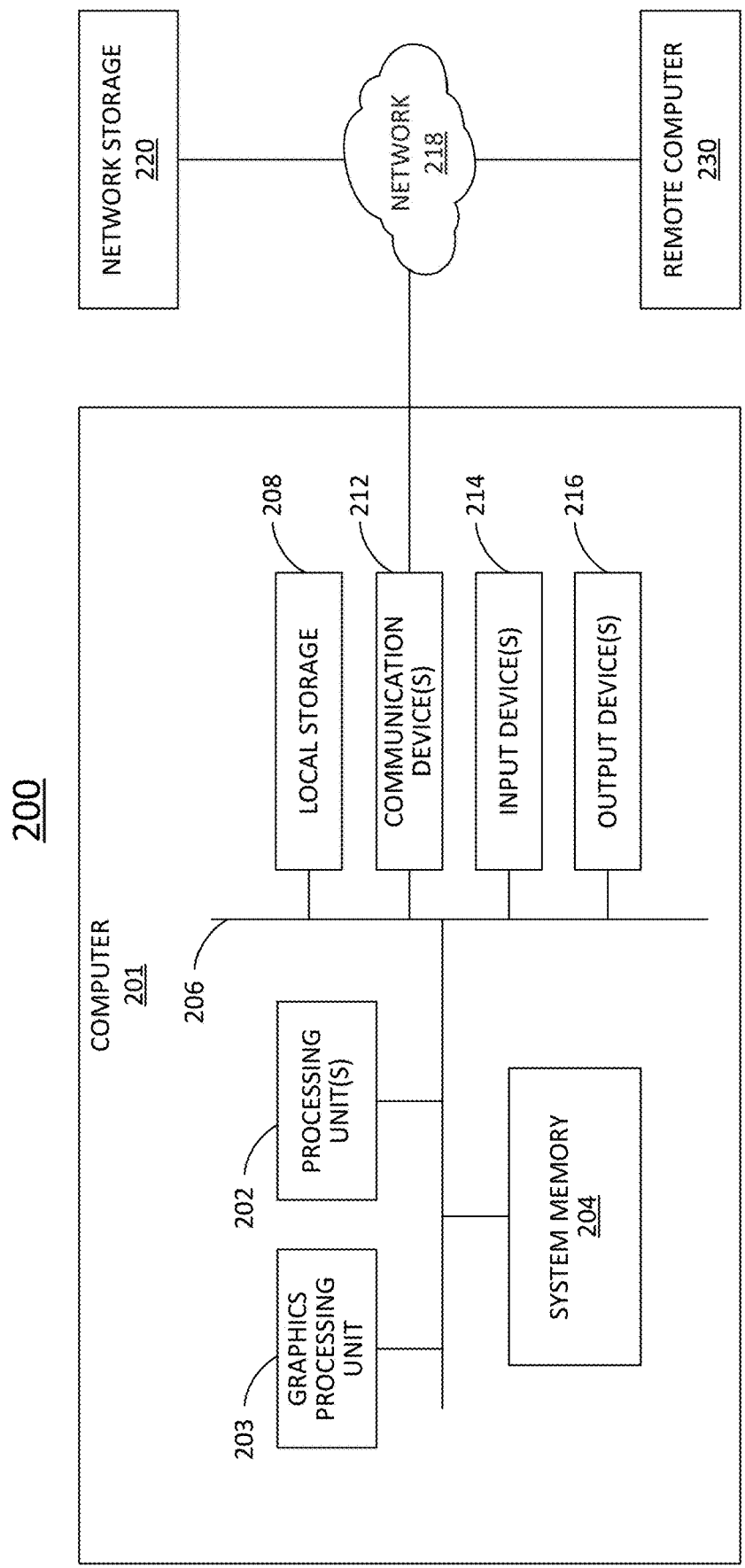
FIG. 2 illustrates a general computer architecture 200 that can be appropriately configured to implement components disclosed in accordance with various embodiments.

FIG. 2 illustrates a general computer architecture 200 that can be appropriately configured to implement components disclosed in accordance with various embodiments. The computing architecture 200 can include various common computing elements, such as a computer 201, a network 218, and one or more remote computers 230. The embodiments disclosed herein, however, are not limited to implementation by the general computing architecture 200.

Referring to FIG. 2, the computer 201 can be any of a variety of general purpose computers such as, for example, a server, a desktop computer, a laptop computer, a tablet computer or a mobile computing device. The computer 201 can include a processing unit 202, a system memory 204 and a system bus 206.

The processing unit 202 can be or include one or more of any of various commercially available computer processors, which can each include one or more processing cores that can operate independently of each other. Additional co-processing units, such as a graphics processing unit 203, also can be present in the computer.

The system memory 204 can include volatile devices, such as dynamic random access memory (DRAM) or other random access memory devices. The system memory 204 can also or alternatively include non-volatile devices, such as a read-only memory or flash memory.

The computer 201 can include local non-volatile secondary storage 208 such as a disk drive, solid state disk, or removable memory card. The local storage 208 can include one or more removable and/or non-removable storage units. The local storage 208 can be used to store an operating system that initiates and manages various applications that execute on the computer. The local storage 208 can also be used to store special purpose software configured to implement the components of the embodiments disclosed herein and that can be executed as one or more applications under the operating system.

The computer 201 can also include communication device(s) 212 through which the computer communicates with other devices, such as one or more remote computers 230, over wired and/or wireless computer networks 218. Communications device(s) 212 can include, for example, a network interface for communicating data over a wired computer network. The communication device(s) 212 can include, for example, one or more radio transmitters for communications over Wi-Fi, Bluetooth, and/or mobile telephone networks.

The computer 201 can also access network storage 220 through the computer network 218. The network storage can include, for example, a network attached storage device located on a local network, or cloud-based storage hosted at one or more remote data centers. The operating system and/or special purpose software can alternatively be stored in the network storage 220.

The computer 201 can have various input device(s) 214 such as a keyboard, mouse, touchscreen, camera, microphone, accelerometer, thermometer, magnetometer, or any other sensor. Output device(s) 216 such as a display, speakers, printer, or eccentric rotating mass vibration motor can also be included.

The various storage 208, communication device(s) 212, output devices 216 and input devices 214 can be integrated within a housing of the computer, or can be connected through various input/output interface devices on the computer, in which case the reference numbers 208, 212, 214 and 216 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Demonstration of User Experience

FIGS. 3-6 show mobile device screen captures from one embodiment of a prototype system for automating user purchases from web merchants operating in non-commercial confidential test environment. The mobile device app for the prototype system is referred to in the screen captures by the name nate$^{SM}$.

FIGS. 3A-E depict a sequence of screens showing a user creating an account and entering user profile information including name, e-mail, shipping address and payment information.

Figure 4A:
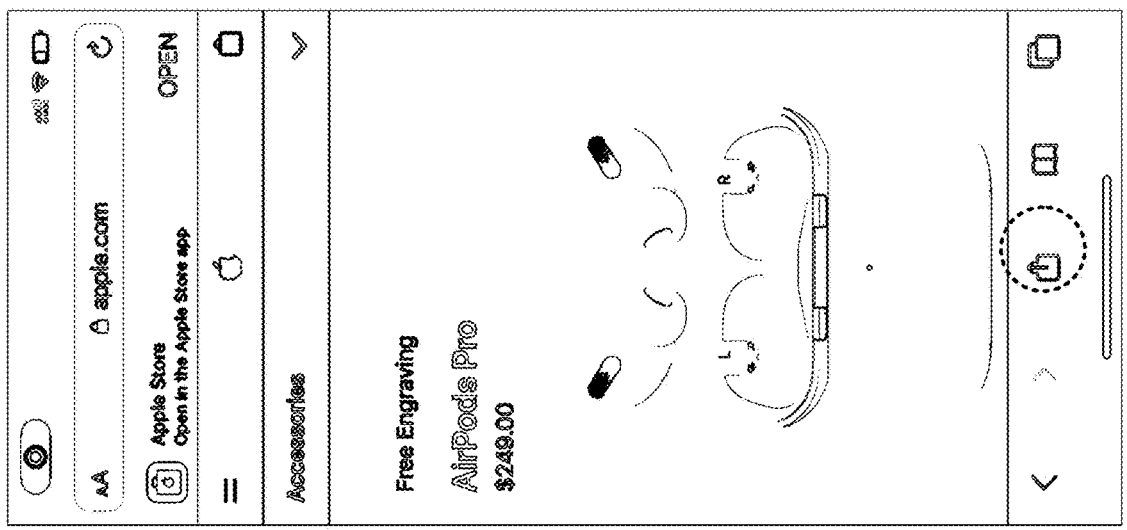
FIGS. 4A-D show a sequence of screens where a user uses the system to purchase an item.
Figure 3E:
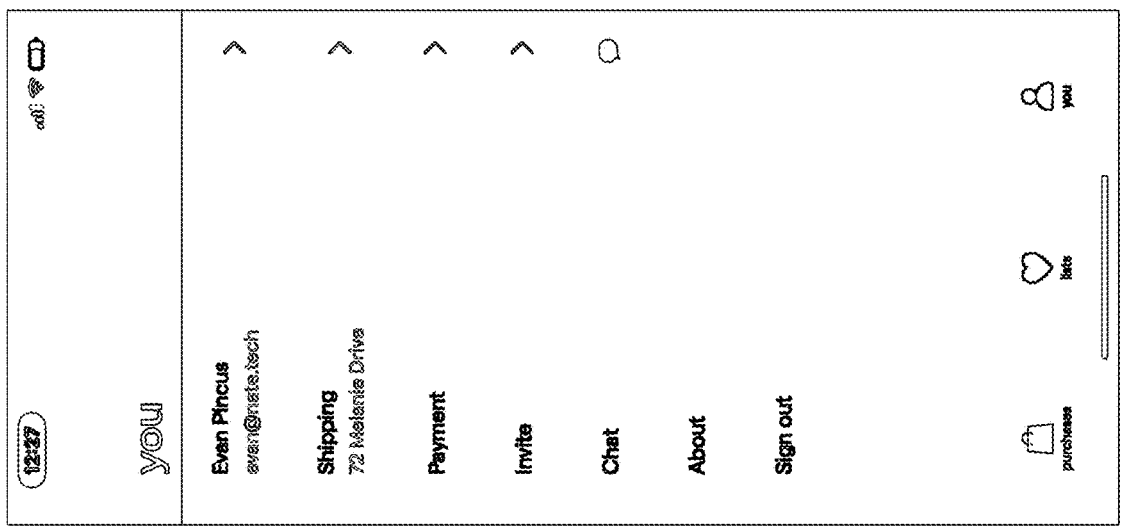
Figure 3D:
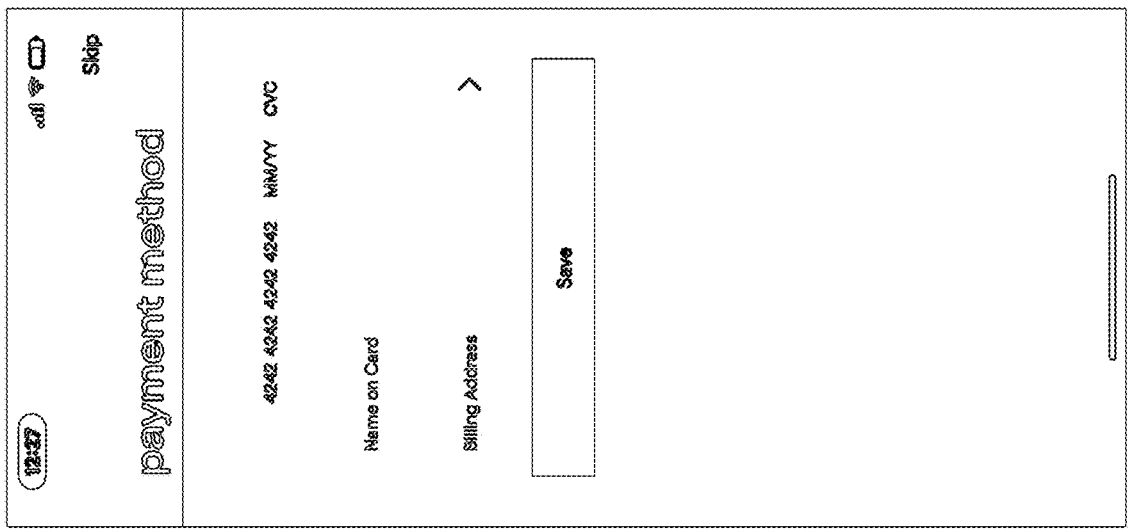
Figure 4D:
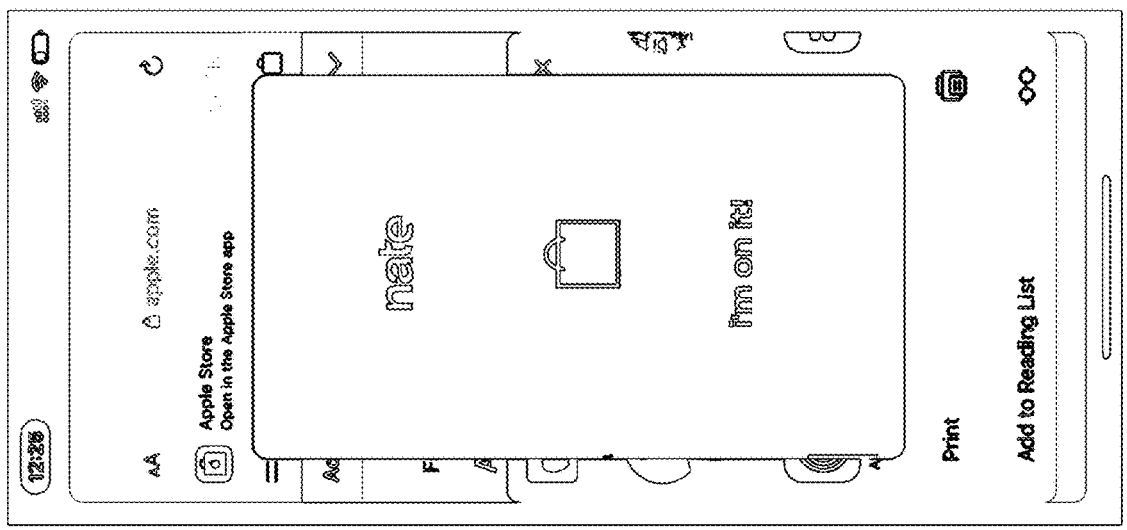
Figure 4C:
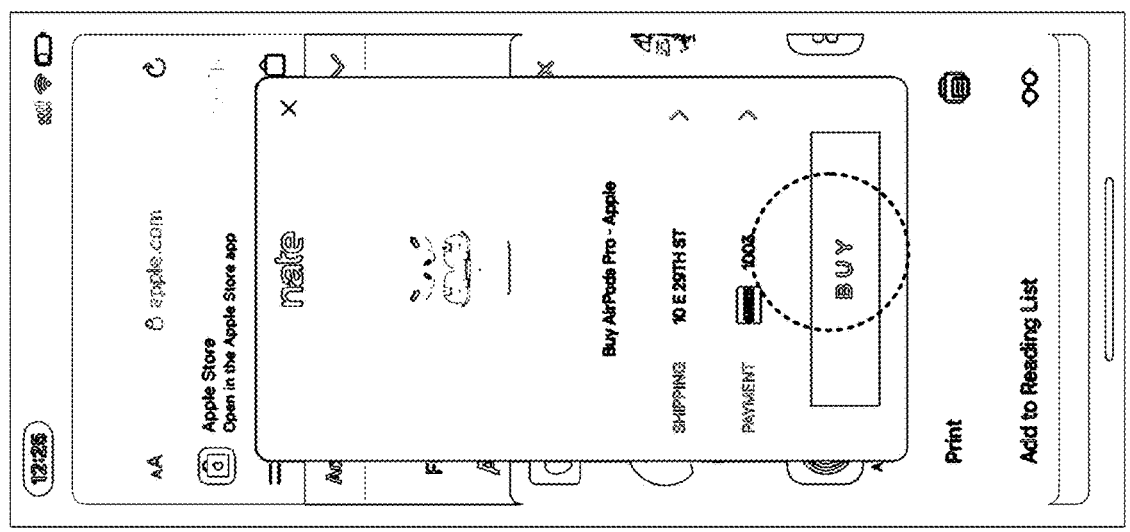
Figure 4B:
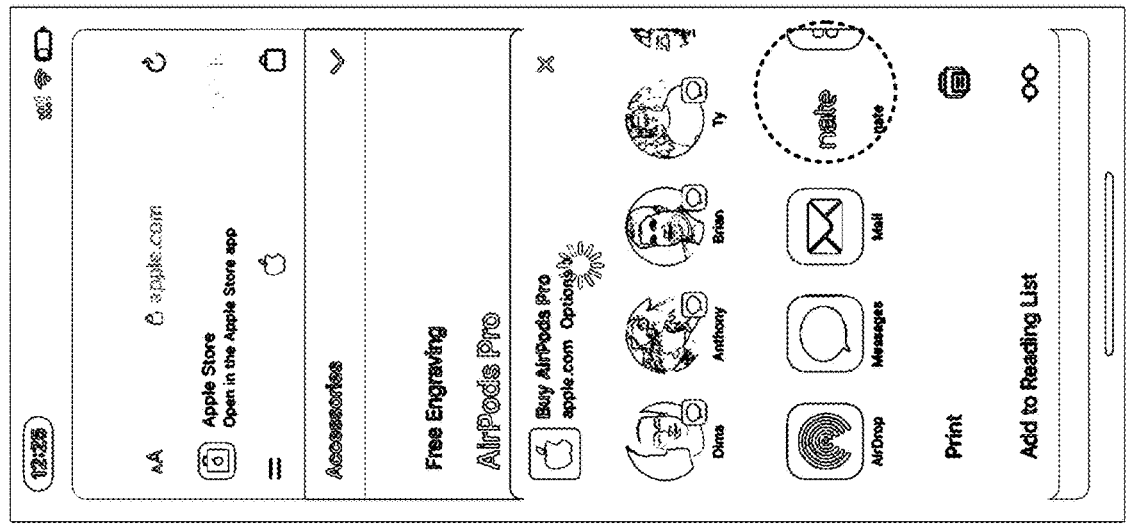

FIGS. 4A-D show a sequence of screens where a user uses the system to purchase an item. In FIG. 4A, the user is browsing a web page at the Apple store and selects the share button (encircled with a dashed line for illustration) in order to share the web page with another application from the web browser. In FIG. 4B, the user selects to share the page with the nate app. In FIG. 4C, the nate app displays a dialog box over the web browser, where the dialog box identifies the Apple AirPods Pro that are featured on the web page shown in the web browser along with options to select a shipping address and form of payment from data previously entered by the user. The user then selects a "BUY" button that causes the nate app to initiate execution, in coordination with the server computer system, of a purchase transaction from the Apple store for the AirPods. In FIG. 4D, the nate app displays a dialog box confirming that the execution of the purchase transaction has been initiated.

Figure 5D:
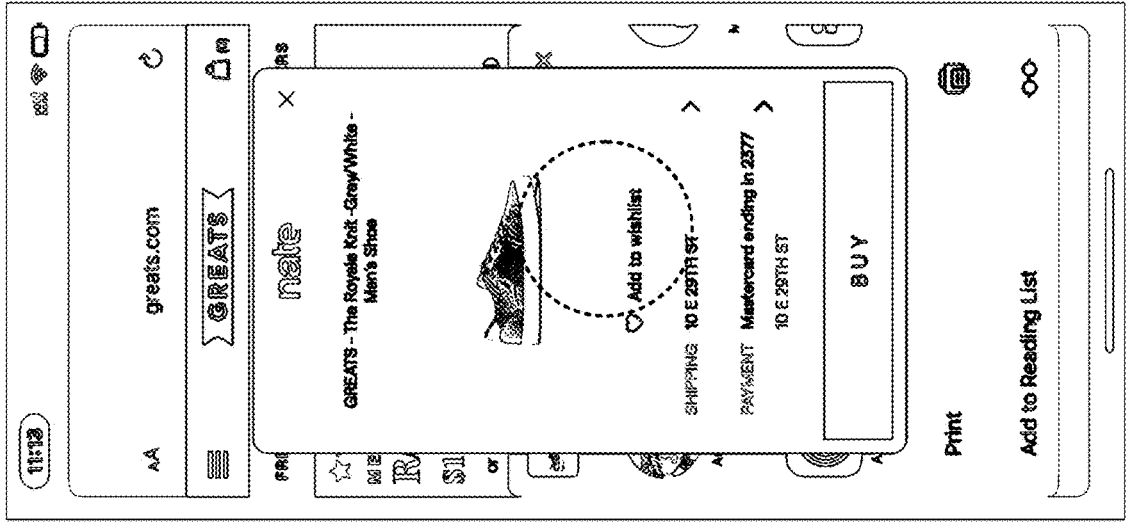
Figure 5E:
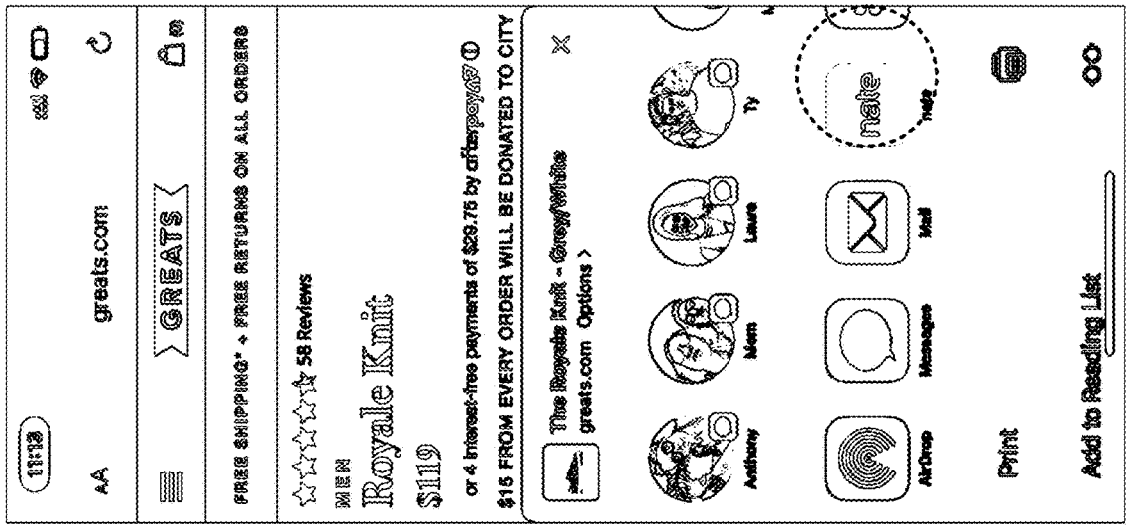
Figure 5F:
Figure 5I:
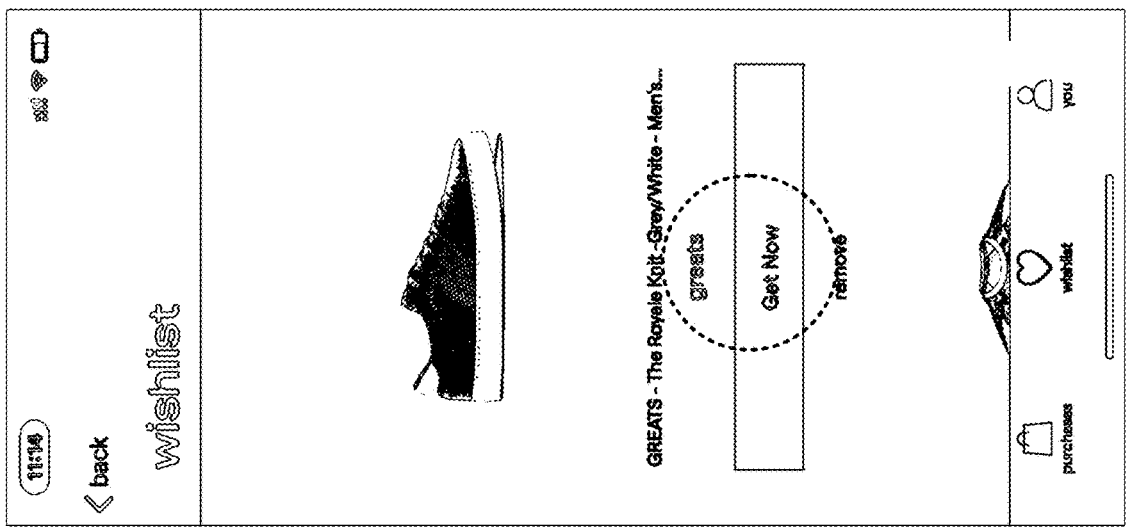
Figure 5H:
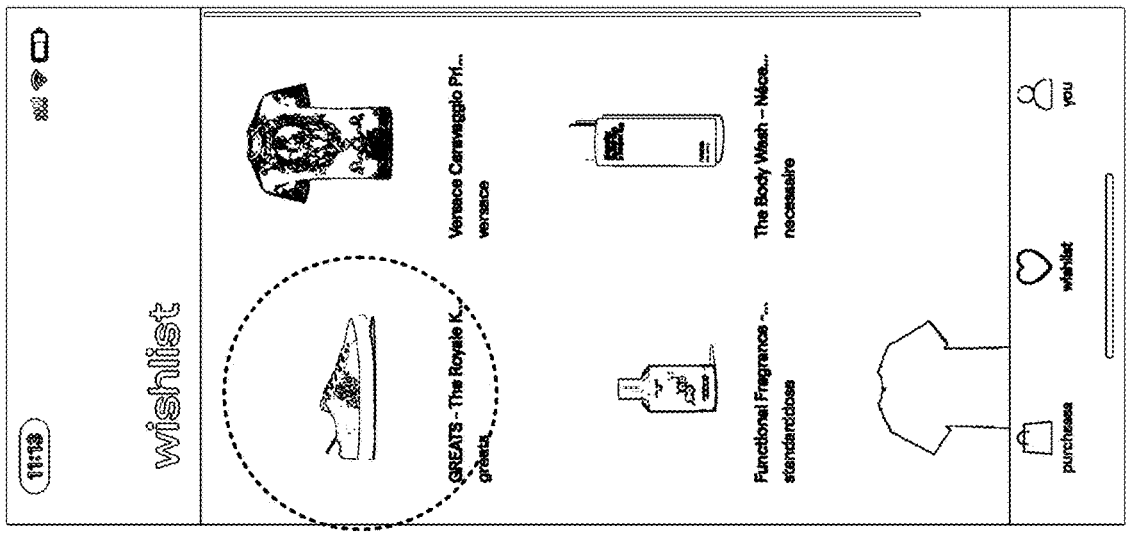
Figure 5G:
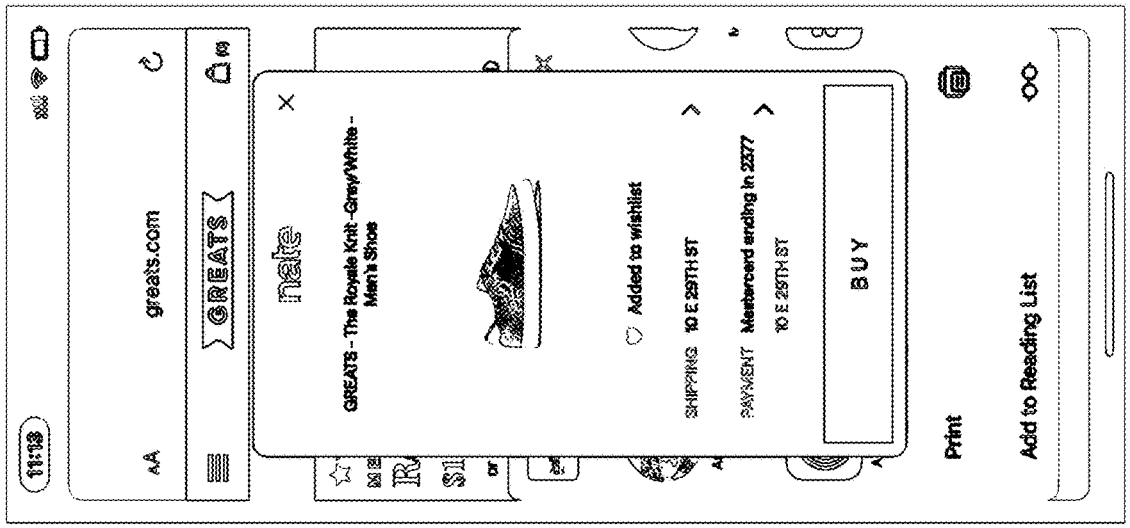
Figure 5L:
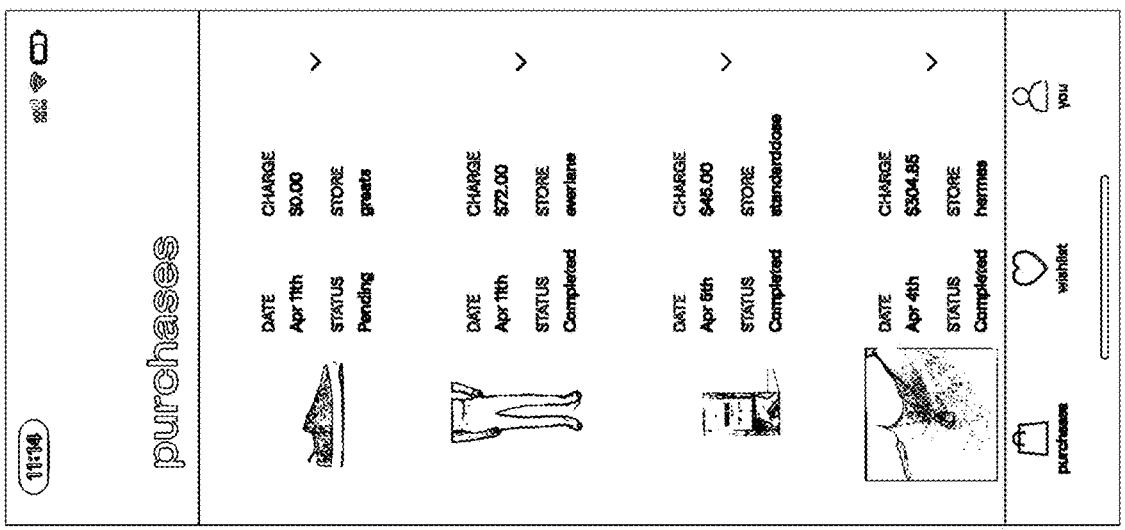
Figure 5K:
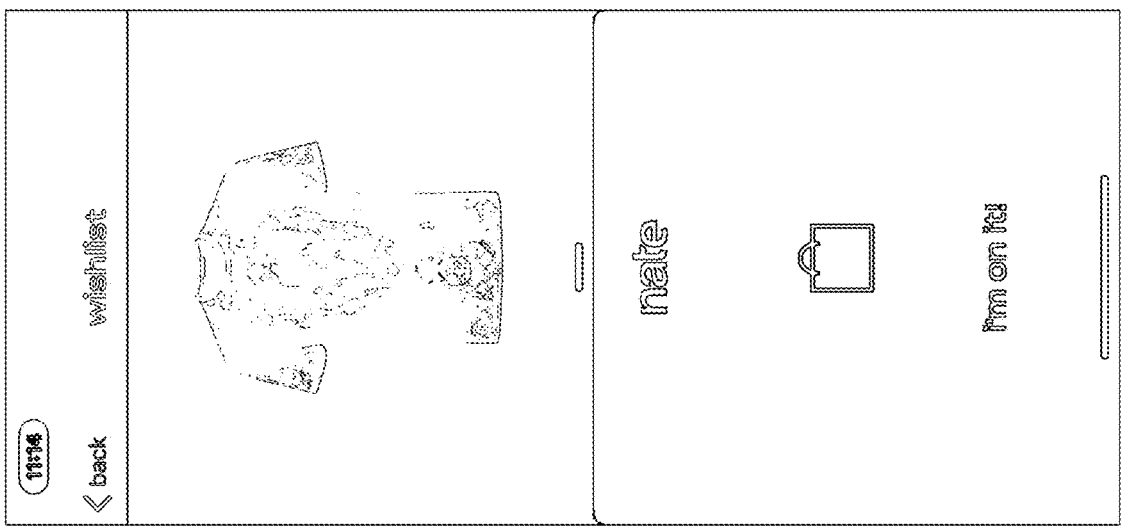
Figure 5J:
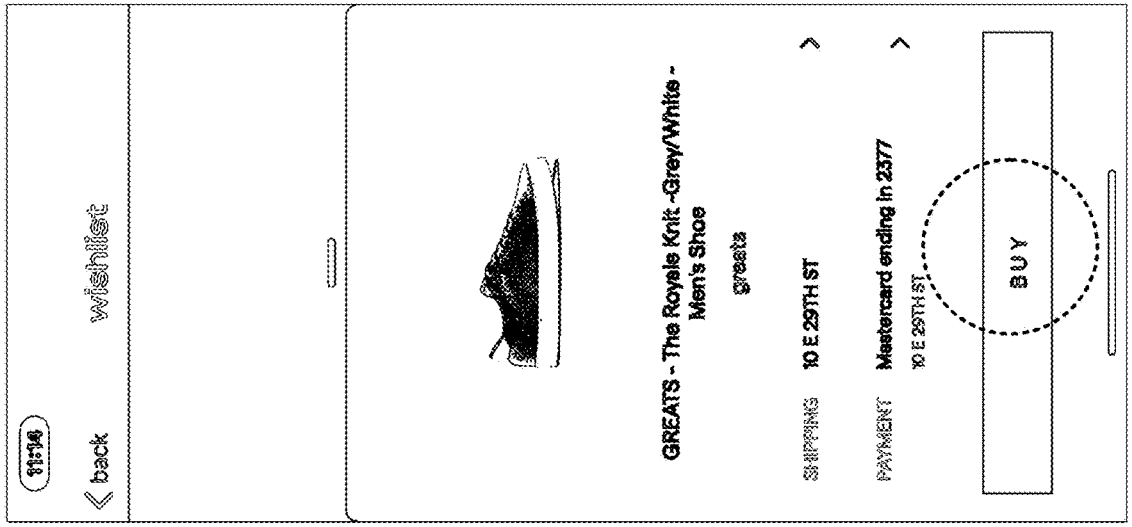
Figure 7A:
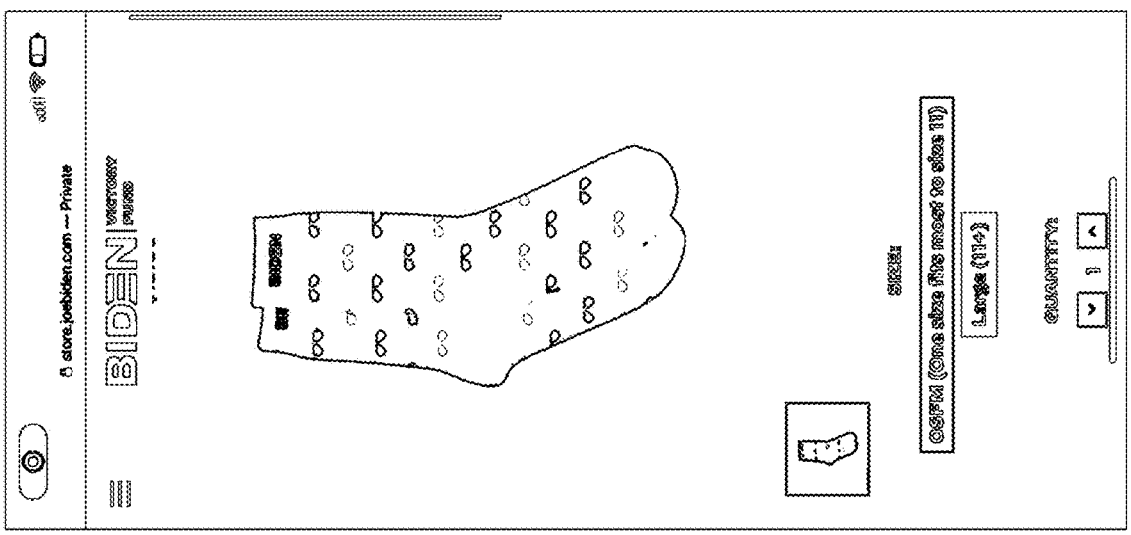

FIGS. 5A-L show a sequence of screens where a user uses the system to add an item featured on a web page to a wishlist and then purchase the item from the wishlist. FIG. 5A shows an initial state of the user's wishlist at the start of the sequence. FIG. 5B shows set of shoes featured for purchase on a web page in a web browser window where the user has selected a color of Grey/White for the pair of shoes. FIG. 5C shows the same page after the user has scrolled down to select a size of 9. FIG. 5D, the user selects the share option from the web browser, and in FIG. 5E, the user selects to share with the nate app. In FIG. 5F, the nate app provides a selectable option to add the pair of shoes, along with the selected product configuration of Grey/White, size 9, in the users wishlist. The option is presented in a dialog box along with a "BUY" option. In FIG. 5G, the nate app indicates in the dialog box that the item has been "Added to wishlist". In FIG. 5H, the user has opened the nate app itself and opened the wishlist within the app, where the wishlist now shows that the pair of shoes has been added. The user then selects the pair of shoes from the wishlist. In FIG. 5I, the nate app responds to the user's selection by displaying the pair of shoes available for purchase along with a "Get Now" option that is selected by the user. In FIG. 5J, the nate app displays a "BUY" user interface along with shipping and payment options in response to the user selecting the "Get Now" option. In FIG. 5K, the nate app displays a dialog box confirming that the execution of the purchase transaction has been initiated. In FIG. 5L, the user has navigated within the nate app to the list of "purchases" which now shows that the purchase of the selected pair of shoes is pending.

Figure 6B:
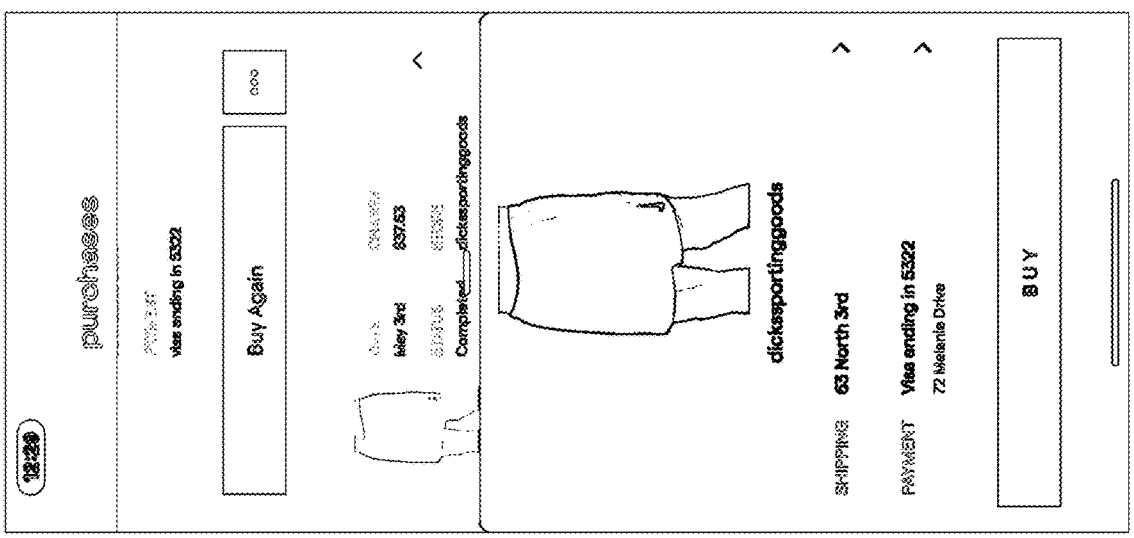
FIGS. 6A-B show a sequence of screens where a user selects an item previously purchased using the nate app from within a list of purchases and then selects to purchase the same item again.
Figure 6A:
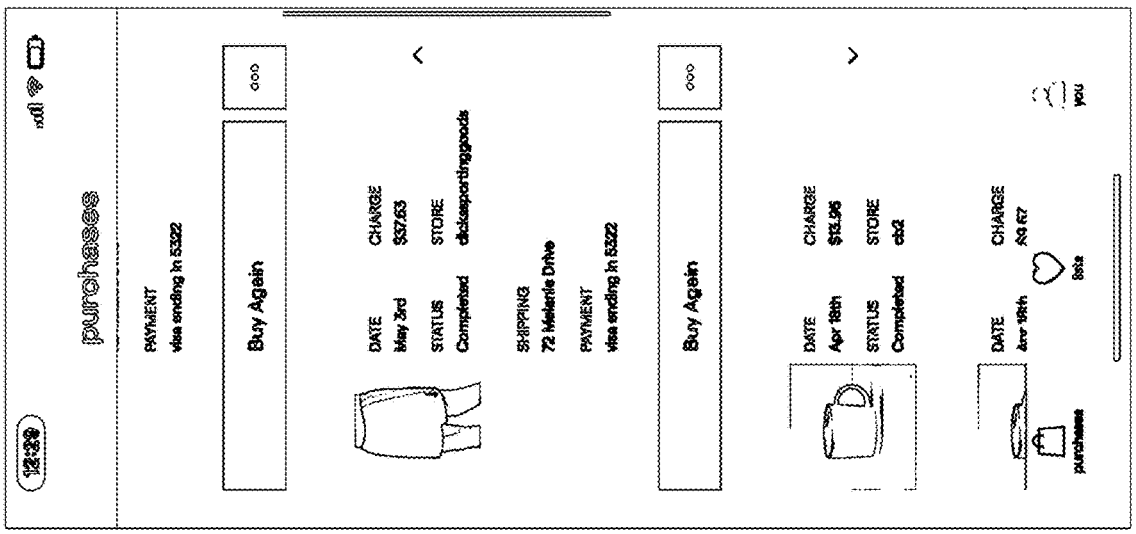
Figure 7D:
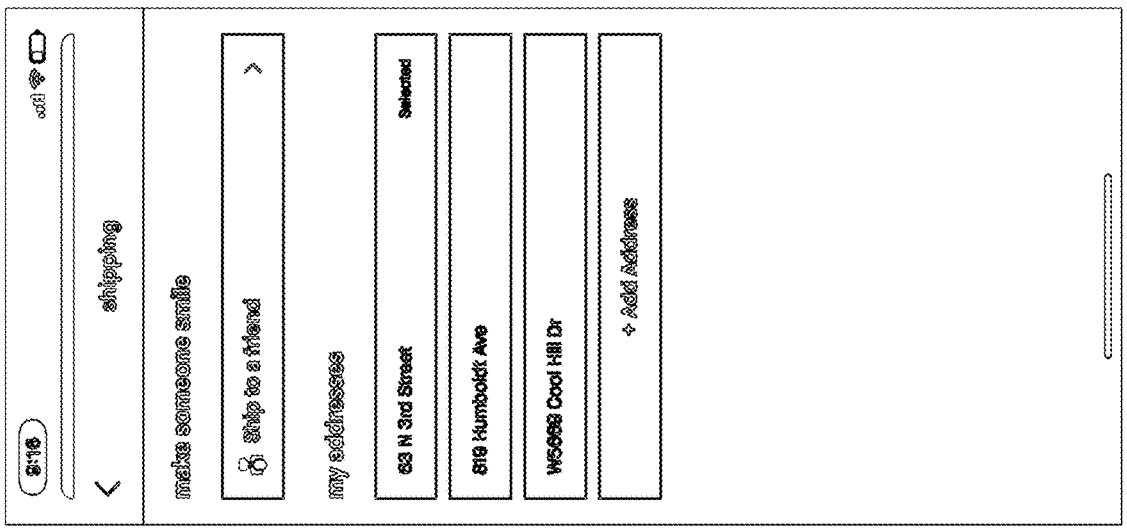
Figure 7C:
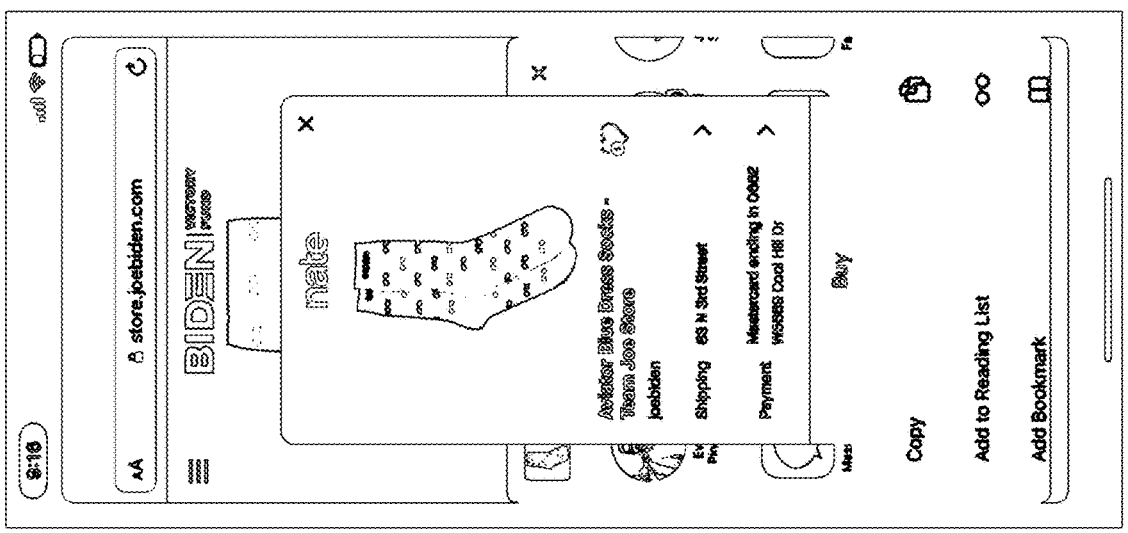
Figure 7B:
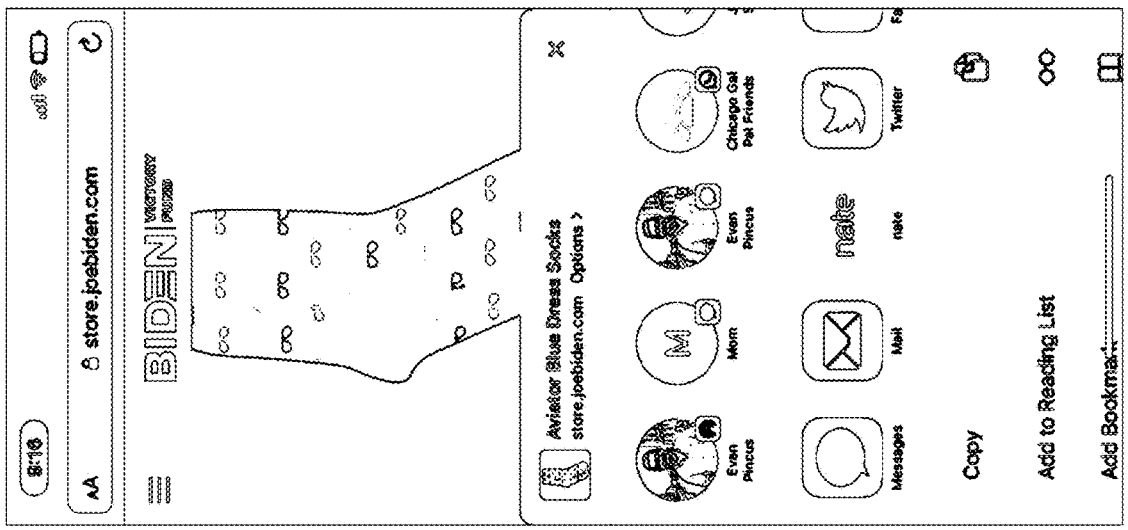
Figure 7G:
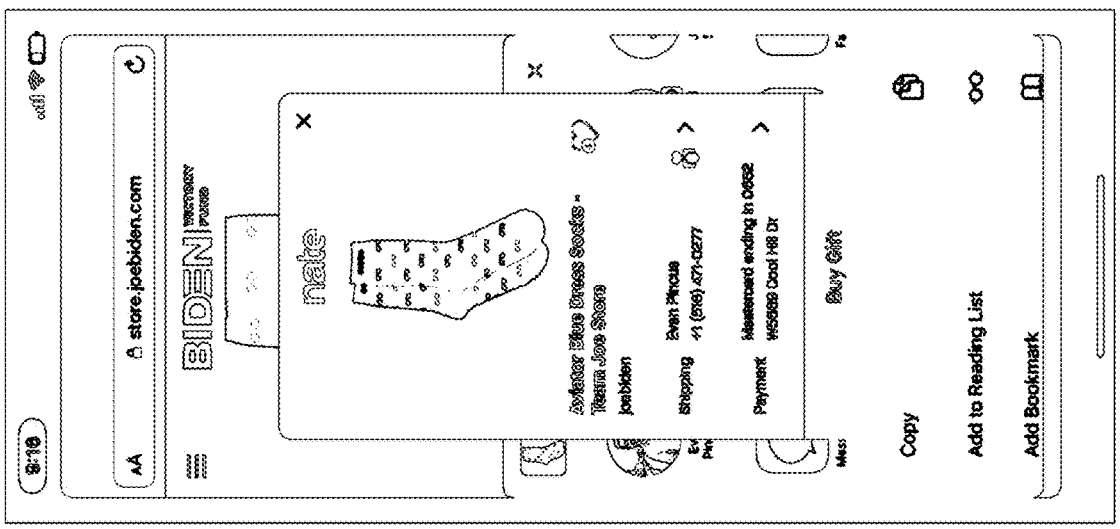
Figure 7F:
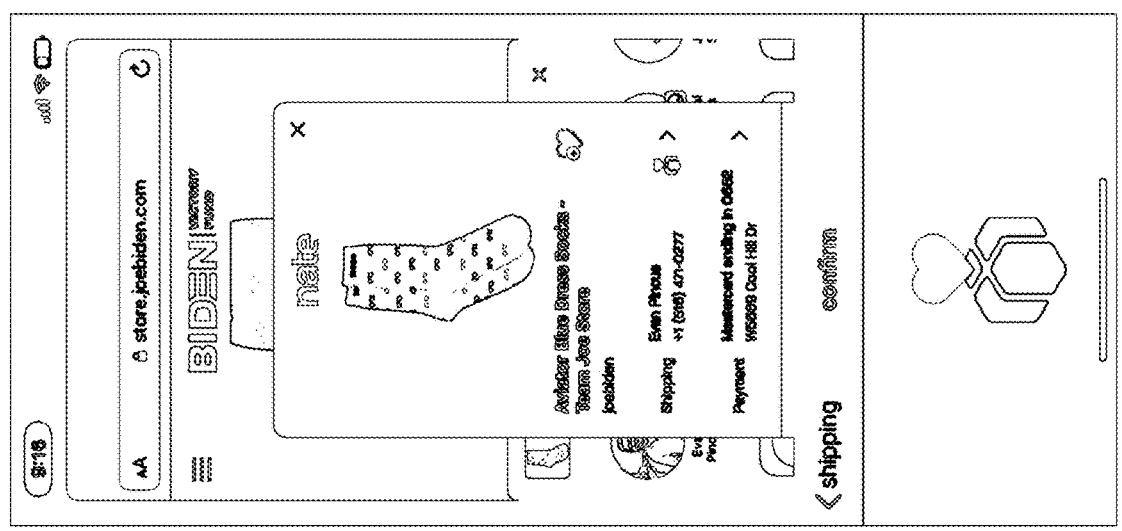
Figure 7E:
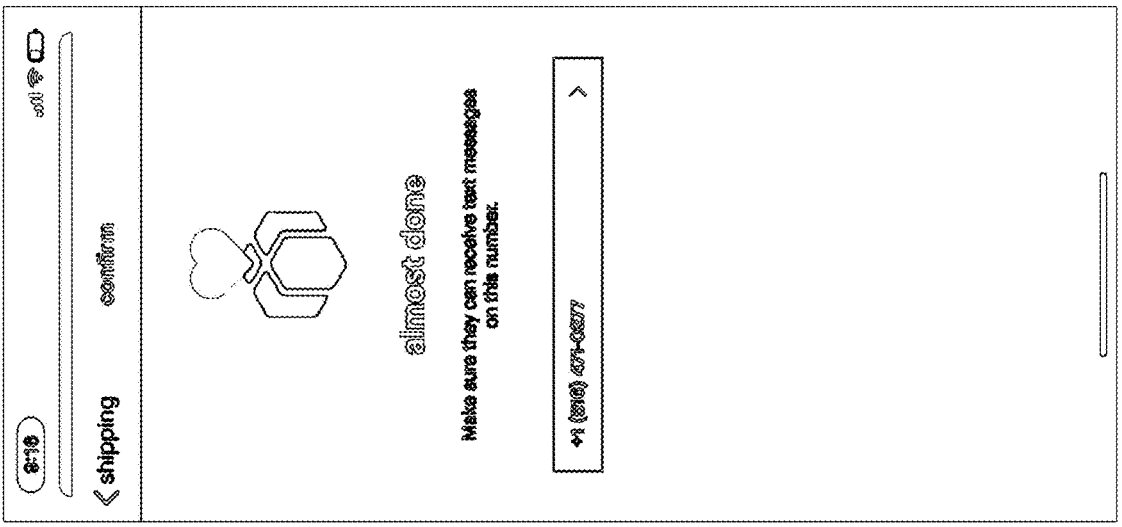

FIGS. 6A-B show a sequence of screens where a user selects an item previously purchased using the nate app from within a list of purchases and then selects to purchase the same item again.

FIGS. 7A-H show a sequence of screens where a gifting user selects an item to gift to a gift recipient through a text message using the nate app. FIGS. 8A-F show a sequence of screens where a gift recipient is notified by text message of a gift from a gifting user and is given the option of accepting or declining the gift and of confirming a shipping address.

The text message sent to the gift recipient can include a link to launch a local installed instance of the nate app running on the gift recipient's mobile device or alternatively to a website through which the recipient can complete the gift transaction. As an alternative to the gift recipient being notified and/or provided a link by text message, other messaging platforms, such as including the link in an e-mail, posting the link to a social networking website, or any other method of sending a link can be used. As yet another alternative, the system can be configured to notify the gift recipient through a notification surfaced by the nate app running on the recipient's mobile device. In this situation, no out-of-band message or communication would be needed, and the notification could be handled by the system by way of communications between the purchasing agent applications running on the gifting user's and gift recipient's mobile devices and the purchasing server computer system.

In different embodiments, different configurations and/or options can be made available to the gifting user and/or the gift recipient where the gift recipient can be informed of the specific nature of the gift at different times. The different times at which the gift recipient can be notified of what, specifically, they have been gifted can include, for example, any of: before accepting the gift, after accepting the gift, or not at all (in which case the nature of the gift can remain a surprise until it is actually received by the gift recipient).

CONCLUSION

Although the subject matter has been described in terms of certain embodiments, other embodiments that may or may not provide various features and aspects set forth herein shall be understood to be contemplated by this disclosure. The specific embodiments described above are disclosed as examples only, and the scope of the patented subject matter is defined by the claims that follow. In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing; encryption of a thing shall include encryption of a portion of the thing. In method claims, any reference characters are used for convenience of description only, and do not indicate a particular order for performing a method.

The invention claimed is:

1. A method performed by a system comprising a first purchasing agent application executing on a first mobile computing device, a second purchasing agent application executing on a second mobile computing device and a server computer system in computer network communication with and operating in coordination and association with the purchasing agent applications, the mobile computing devices and the server computer system each having at least one processor and a memory, the method comprising:

the first purchasing agent application receiving a URL for a web page from a other application executing on the first mobile computing device in response to user input to a user interface of the other application by a user of the first mobile computing device, wherein the web page is published by and on a web site of a third party online merchant unassociated with the purchasing agent applications and the server computing system;

analyzing one or more of the URL, the web page, and a document object model of the web page to identify a set of one or more purchasable items featured on the web page;

the first purchasing agent application presenting in a separate user interface from the other application an identification of the identified set of items in association with an option to purchase the set of items from the third party online merchant as a gift for a gift recipient;

the first purchasing agent application, in response to user input indicating acceptance of the option to purchase the set of items as a gift for the gift recipient, causing a message to be sent to the gift recipient informing the gift recipient of the gift;

the second purchasing agent application, in response to user input by the gift recipient indicating acceptance of the gift, transmitting an instruction to the server computer system to cause the server computer system to execute a purchase of the set of items;

the server computer system, in response to receiving the instruction, loading the web page in its memory; and the server computer system, further in response to receiving the instruction and starting from the web page, using a machine learning model to interact with the web site of the third party online merchant to complete the purchase of the set of items on behalf of the user, wherein the other application is a web browser, wherein the URL is received by the first purchasing agent application in response to a user selection of a share option to share the URL with the first purchasing agent application, and wherein the presenting the identification of the set of items is performed by the first purchasing agent application further in response to the user selection of the share option.

2. The method of claim 1, further comprising:
the second purchasing agent application presenting to the gift recipient an option to accept or decline the gift.

3. The method of claim 2, further comprising:
the second purchasing agent application presenting to the gift recipient an identification of the set of items before or during presenting the option to accept or decline the gift.

4. The method of claim 2, further comprising:
the second purchasing agent application presenting to the gift recipient an identification of the set of items after the user input by the gift recipient indicating acceptance of the gift.

5. The method of claim 2:
wherein the second purchasing agent application presenting to the gift recipient an option to accept or decline the gift is performed in response to the causing a message to be sent to the gift recipient informing the gift recipient of the gift.

6. The method of claim 5, wherein the causing a message to be sent to the gift recipient informing the gift recipient of the gift is performed via any of:
text message,
e-mail,
mobile device application notification,
desktop computer application notification, and
website notification through a web browser.

7. The method of claim 2, further comprising:
posting a message on a website, the message including a link through which the gift can be accepted, wherein the presenting to the gift recipient an option to accept or decline the gift is performed in response to the gift recipient activating the link.

8. The method of claim 1, further comprising:
the second purchasing agent application presenting an option to the gift recipient to confirm or supply a shipping address.

9. The method of claim 1, further comprising:
the first purchasing agent application presenting an option to a user of the first mobile computing device to select among:
presenting to the gift recipient an identification of the set of items before or during presenting the option to accept or decline the gift, and
presenting to the gift recipient an identification of the set of items after receiving acceptance of the gift.

10. The method of claim 1, wherein the web page is a product offering web page for a product on a web site of the third party online merchant.

11. The method of claim 1, wherein the web page is a shopping cart web page on a web site of the third party online merchant.

12. The method of claim 1, further comprising:
the first purchasing agent application receiving purchase profile information from the user through the user interface, the purchase profile information comprising a name and a form of payment; and
the first purchasing agent application transmitting the purchase profile information to the server computer system,
wherein the server computer system uses the purchase profile information to complete the purchase of the set of items on behalf of the user.

13. The method of claim 1, further comprising:
the first purchasing agent application transmitting one or more of the URL and the document object model of the web page to the server computer system.

14. The method of claim 1, wherein the "analyzing one or more of the URL, the web page, and a document object model of the web page to identify a set of one or more purchasable items featured on the web page" is performed using a machine learning model.

15. The method of claim 1, further comprising:
further in response to receiving the instruction, analyzing the document object model of the web page to identify for the set of one or more items, one or more product configuration variables; and
for each of the one or more product configuration variables, identifying a value selected by the user on the web page through the other application,
wherein the server computer system completes the purchase of the set of items in accordance with the identified value for each of the one or more product configuration variables.

16. The method of claim 15, wherein the one or more product configuration variables is identified using a machine learning model.

17. The method of claim 1, further comprising:
analyzing the web page to identify, for the set of one or more items, one or more product configuration variables;
the first purchasing agent presenting in a user interface an identification of the one or more product configuration variables;
the first purchasing agent application, receiving user input selecting a value for each of the one or more product configuration variables; and
the first purchasing agent application transmitting the selected value(s) to the server computer system,
wherein the server computer system completes the purchase of the set of items in accordance with the identified value for each of the one or more product configuration variables.

18. The method of claim 17, wherein the one or more product configuration variables is identified using a machine learning model.

19. The method of claim 17, wherein the first purchasing agent presents the identification of the one or more product configuration variables in the user interface in association with the option to purchase the set of items.

20. The method of claim 17, wherein the purchasing agent presents the identification of the one or more product configuration variables in the user interface in response to the user input indicating acceptance of the option to purchase the set of items.

* * * * *